(12) United States Patent
Zhou et al.

(10) Patent No.: US 12,025,381 B2
(45) Date of Patent: Jul. 2, 2024

(54) VAPOR CHAMBER AND MANUFACTURING METHOD THEREOF

(71) Applicant: COOLER MASTER CO., LTD., New Taipei (TW)

(72) Inventors: Dingguo Zhou, New Taipei (TW); Xuemei Wang, New Taipei (TW); Jen-Chih Cheng, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 201 days.

(21) Appl. No.: 16/687,449

(22) Filed: Nov. 18, 2019

(65) Prior Publication Data

US 2020/0200484 A1 Jun. 25, 2020

(30) Foreign Application Priority Data

Dec. 25, 2018 (CN) .......................... 201811591637.7

(51) Int. Cl.
*F28D 15/04* (2006.01)
*B23P 15/26* (2006.01)
*F28D 15/02* (2006.01)

(52) U.S. Cl.
CPC ............ *F28D 15/043* (2013.01); *B23P 15/26* (2013.01); *F28D 15/0283* (2013.01)

(58) Field of Classification Search
CPC .... F28D 15/043; F28D 15/0283; F28D 15/26; F28D 15/0233; F28D 15/04; F28D 15/02;

(Continued)

(56) References Cited

U.S. PATENT DOCUMENTS

2008/0080133 A1* 4/2008 Yang ................. H05K 7/20336
                                                                361/688
2009/0178784 A1* 7/2009 Wang ................. F28D 15/0233
                                                                165/104.26

(Continued)

FOREIGN PATENT DOCUMENTS

CN          202014433 U       10/2011
CN          203810998 U   *    9/2014   ................ F28F 3/12

(Continued)

OTHER PUBLICATIONS

CN Office Action in Application No. 201811591637.7 dated Feb. 1, 2021.

*Primary Examiner* — Harry E Arant
(74) *Attorney, Agent, or Firm* — Merchant & Gould

(57) ABSTRACT

This disclosure relates to a manufacturing method of a vapor chamber that includes the following steps. Form a containing space and a flow channel on a first cover. Place a second cover on the first cover, such that the first cover and the second cover together form a chamber at the containing space of the first cover and form a passage at the flow channel of the first cover. Enlarge part of the passage so as to create a circular passage portion and a flat passage portion in the passage. Insert a degassing tube into the circular passage portion of the passage. Draw gas from the chamber and fill working fluid into the chamber via the degassing tube. Seal a joint between the chamber and the flat passage portion by a resistance-welding process. Cut off parts of the first cover and the second cover that surround the passage.

12 Claims, 19 Drawing Sheets

(58) Field of Classification Search
CPC ... F28F 13/12; F28F 2255/08; H05K 7/20366
See application file for complete search history.

(56) References Cited

U.S. PATENT DOCUMENTS

| | | | | |
|---|---|---|---|---|
| 2011/0192576 A1* | 8/2011 | Wang | ............... | F28D 15/04 |
| | | | | 165/104.26 |
| 2014/0076995 A1* | 3/2014 | Wang | ............... | G06F 1/20 |
| | | | | 239/145 |
| 2016/0341486 A1* | 11/2016 | Kim | ............... | H01L 23/427 |
| 2019/0160600 A1* | 5/2019 | Tseng | ............... | B23K 37/04 |

FOREIGN PATENT DOCUMENTS

| | | | |
|---|---|---|---|
| CN | 106225538 A | * | 12/2016 |
| CN | 107204314 A | | 9/2017 |
| CN | 208047152 U | | 11/2018 |

\* cited by examiner

VAPOR CHAMBER AND MANUFACTURING METHOD THEREOF

CROSS-REFERENCE TO RELATED APPLICATIONS

This non-provisional application claims priority under 35 U.S.C. § 119(a) on Patent Application No(s). 201811591637.7 filed in China, P.R.C. on Dec. 25, 2018, the entire contents of which are hereby incorporated by reference.

TECHNICAL FIELD

The present disclosure relates to a vapor chamber and a manufacturing method thereof, more particularly to a vapor chamber having a reliable structure and a manufacturing method thereof.

BACKGROUND

Applying a vapor chamber as a heat dissipation device is an effective way to deal with the increasing amount of heat generated by a heat source in an electronic product nowadays. Thus, the thermal dissipation structure that is composed of heat sinks is gradually replaced by the vapor chamber. However, under the trend of lightweight, thinness, shortness and smallness electronic products, the space for accommodating the electrical component (including the heat source) is very limited, thus how to redesign the vapor chamber to catch up the trend is an important topic in the field.

A conventional vapor chamber mainly includes a shell, a capillary, a working fluid and a degassing tube. The shell has a chamber. The capillary is disposed in the chamber. The working fluid is filled in the chamber. Part of the degassing tube is inserted into the shell and the rest part thereof sticks out of the shell. The final steps of manufacturing the conventional vapor chamber are filling the working fluid into the chamber first, drawing the gas out of the chamber, and then sealing the degassing tube.

The rest part of the degassing tube that sticks out of the conventional vapor chamber always has interference with other components in the electronic product, resulting in a limited application of the conventional vapor chamber. Accordingly, some manufactures cut off the part of the degassing tube that sticks out of the shell and seal the remaining degassing tube.

SUMMARY

According to one aspect of the present disclosure, a manufacturing method of a vapor chamber that includes the following steps. Form a containing space and a flow channel on a first cover, wherein the containing space and the flow channel are connected to each other. Place a second cover on the first cover, such that the first cover and the second cover together form a chamber at the containing space of the first cover and form a passage at the flow channel of the first cover. Enlarge part of the passage so as to create a circular passage portion and a flat passage portion in the passage, wherein the flat passage portion is located between the circular passage portion and the chamber. Insert a degassing tube into the circular passage portion of the passage. Draw gas from the chamber and fill working fluid into the chamber via the degassing tube. Seal a joint between the chamber and the flat passage portion by a resistance-welding process so as to form a depressed structure. Cut off parts of the first cover and the second cover that surround the passage.

According to another aspect of the present disclosure, a vapor chamber includes an upper cover and a lower cover. The upper cover and the lower cover are assembled together and form a chamber therebetween. There is a sealing structure located at an edge of the vapor chamber. The upper cover is directly stacked on the lower cover at the sealing structure.

According to another aspect of the present disclosure, a vapor chamber includes an upper cover, a lower cover, a capillary structure and a sealing structure. The upper cover and the lower cover are assembled together. The upper cover or the lower cover has a recess to become a chamber between the upper cover and the lower cover. The capillary structure is located in the chamber. The sealing structure is located at an edge of the vapor chamber for preventing working fluid from leaking from the chamber.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
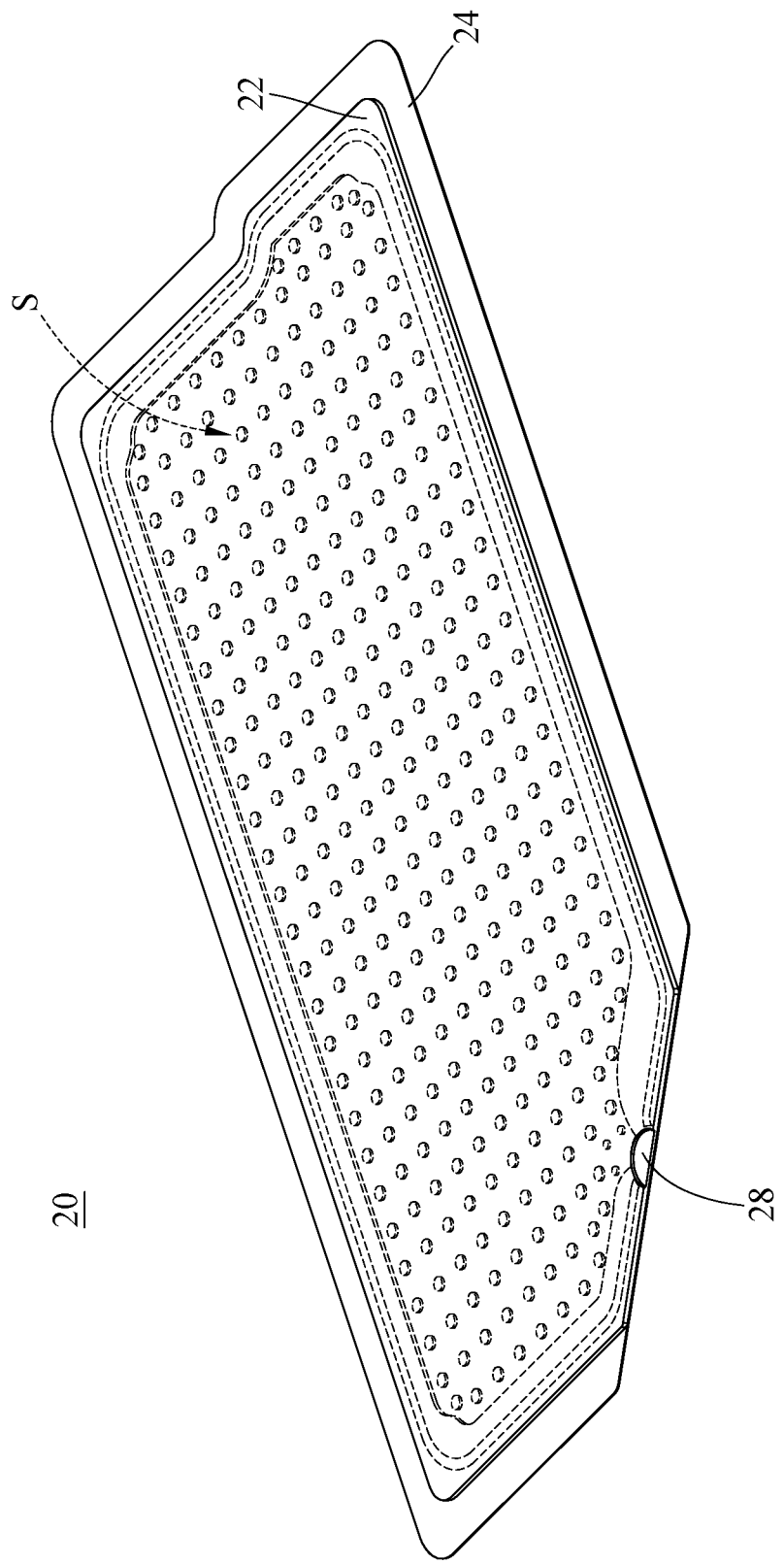
FIG. 1 is a perspective view of a vapor chamber according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a perspective view of a vapor chamber according to a first embodiment of the present disclosure A vapor chamber 20 is, for example, in a thin-plate shape, and vapor chamber 20 has a thickness, for example, smaller than 0.6 centimeters. The vapor chamber 20 includes an upper cover 22 and a lower cover 24.

The material of the upper cover 22 and the lower cover 24 is, for example, metal, and the upper cover 22 and the lower cover 24 are assembled together by, for example, a soldering, welding, brazing, or diffusion bonding, so as to form a chamber S therebetween. In addition, the vapor chamber 20 further includes a capillary structure (not shown in the drawings) located inside the chamber S. There is a sealing structure 28 located at an edge of the vapor chamber 20 for preventing working fluid from leaking from the chamber S. The sealing structure 28 is formed by, for example, a resistance welding process. The upper cover 22 is directly stacked on the lower cover 24 at the sealing structure 28. That is, there is no other plate located in the sealing structure 28 except for adhesive or solder. The processes of manufacturing the vapor chamber 20 are described below.

Please refer to FIG. 2 to FIG. 10, which show a manufacturing process of the vapor chamber.

Figure 2:
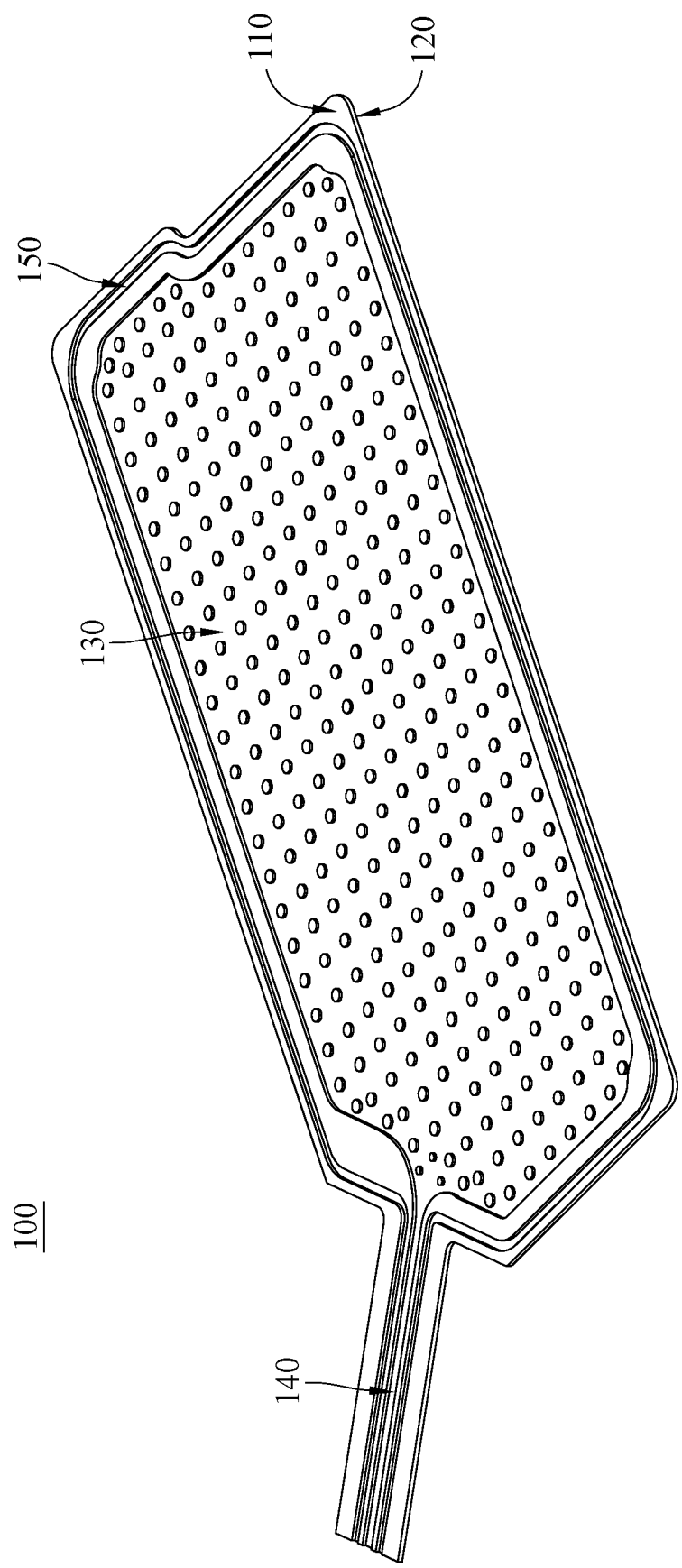
FIG. 2 to FIG. 10 show a manufacturing process of the vapor chamber.

Firstly, as shown in FIG. 2, a first cover 100 is provided. The first cover 100 has a first contacting surface 110, a first back surface 120, a containing space 130 and a flow channel 140. The first back surface 120 faces away from the first contacting surface 110. The containing space 130 and the flow channel 140 are formed on the recess of the first contacting surface 110 by, for example, an etching, sand blasting, or stamping process. The containing space 130 and the flow channel 140 are connected to each other. The containing space 130 and the flow channel 140 are not limited to be formed by the same or different etching processes.

In this embodiment, the containing space 130 and the flow channel 140 may be formed by a stamping process. In some other embodiment, the stamping process may cause the first back surface of the first cover to deform. But in this embodiment, as shown in the figure, most of the first back surface 120 is still flat.

Figure 3:
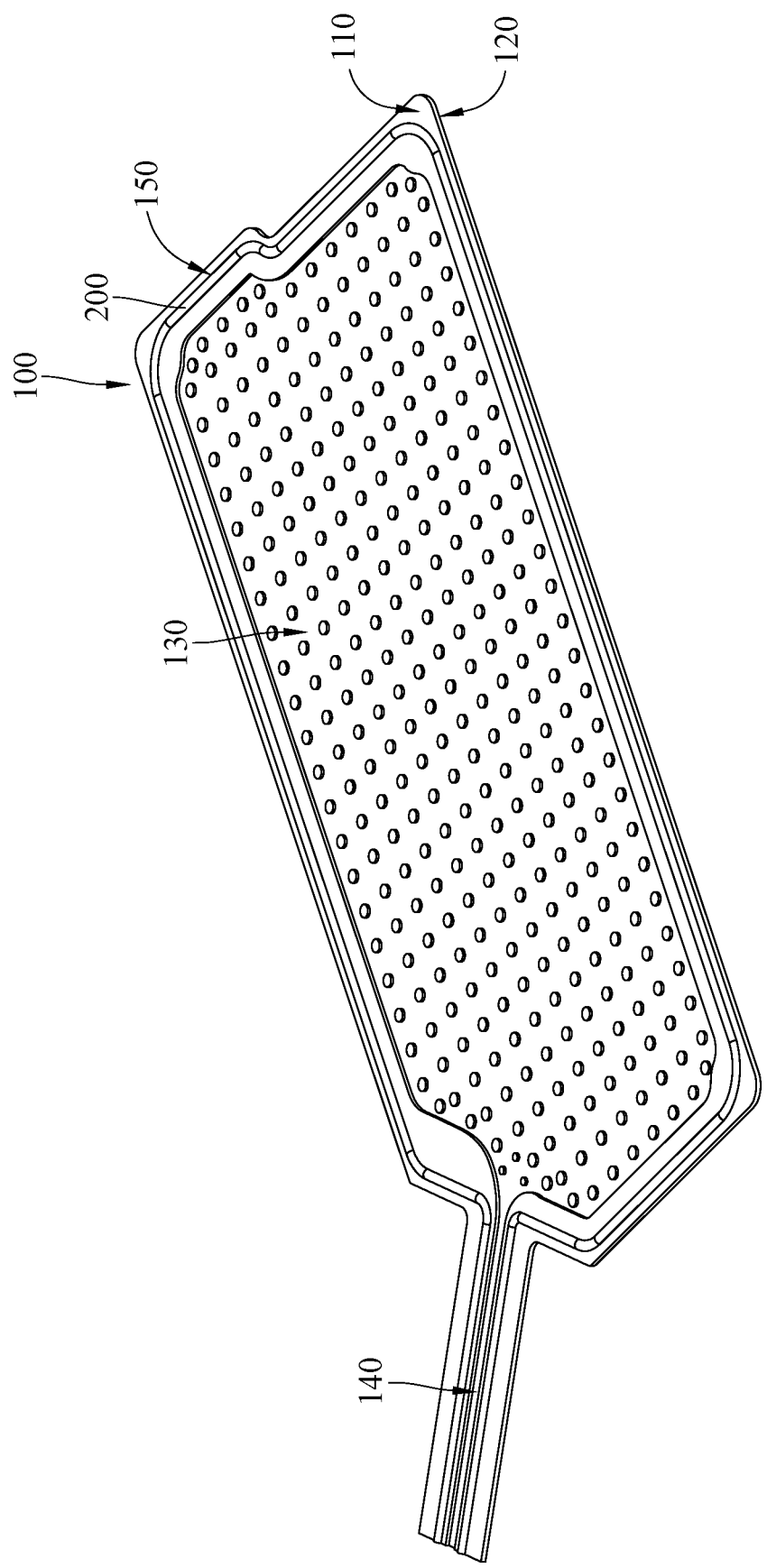

Then, as shown in FIGS. 2-3, the first cover 100 further has at least one groove 150 formed on the first contacting surface 110 along the contour of the edge of the first cover 100, and a solder 200 is injected into the groove 150. The solder 200 is, for example, a copper paste.

Figure 4:
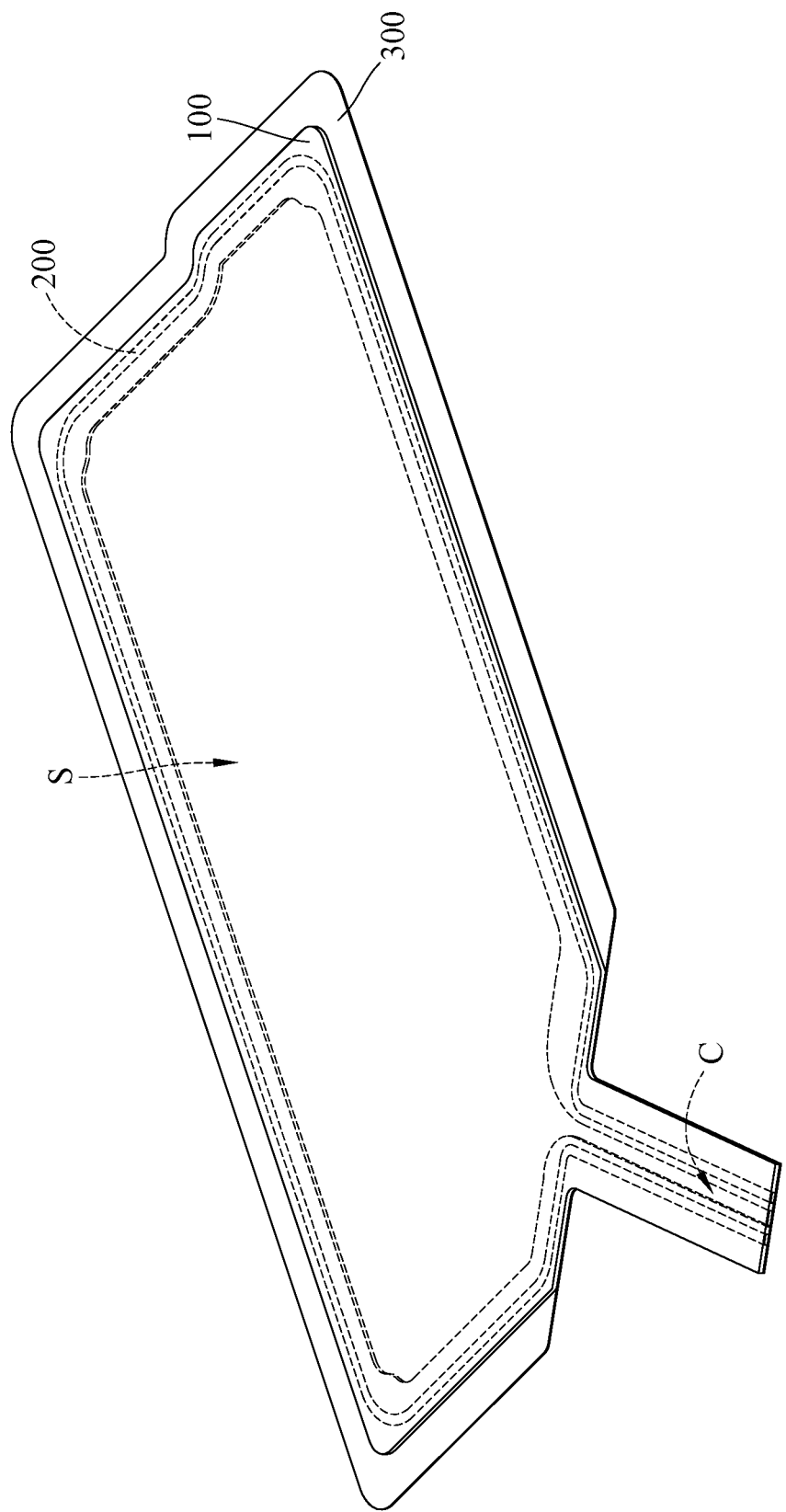

Then, as shown in FIG. 4, a second cover 300 is placed on the first cover 100. In detail, the second cover 300 is, for example, a flat plate stacked on the first cover 100 and the solder 200 which is on the first cover 100. And then the first cover 100 and the second cover 300 are assembled to each other by a soldering process, such that the first cover 100 and the second cover 300 together form the chamber S at the containing space 130 of the first cover 100 and a passage C connected to the chamber S at the flow channel 140 of the first cover 100.

Figure 5:
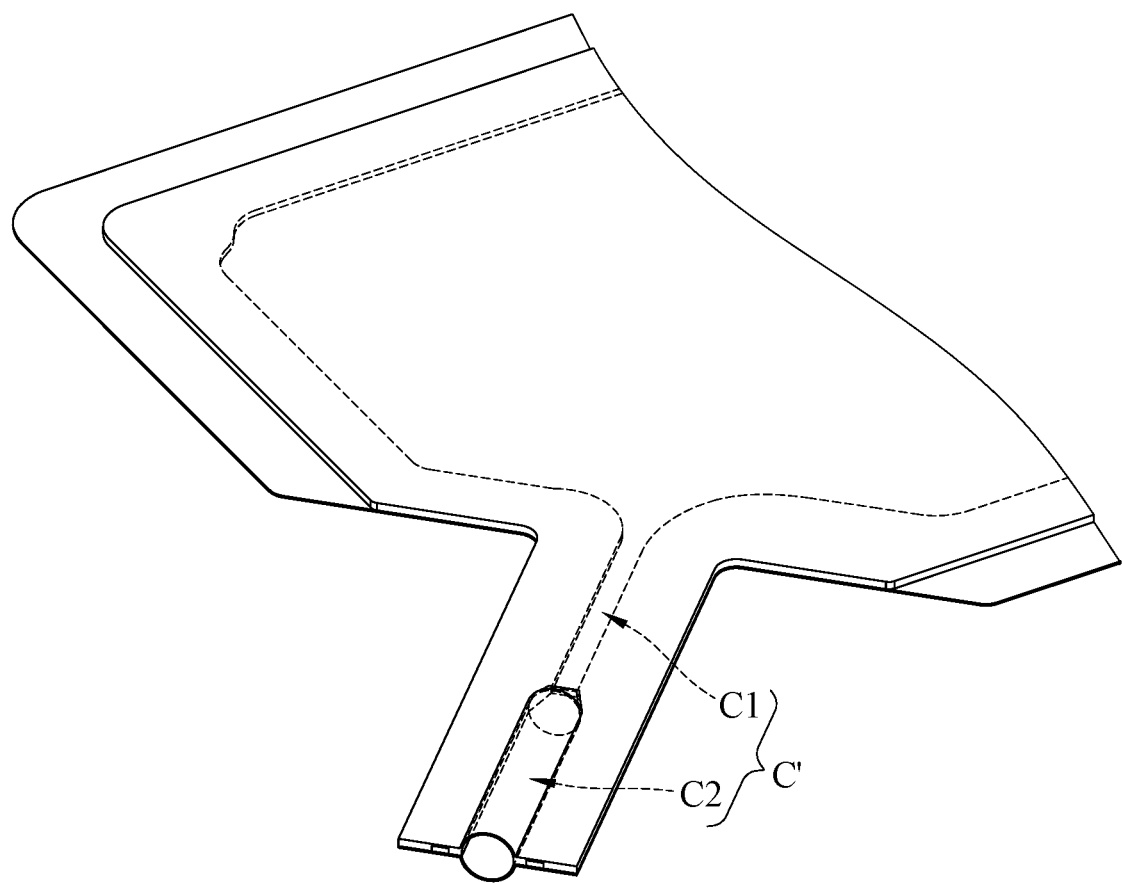

Then, part of the passage C is enlarged by, for example, inserting a tapered needle (not shown in the drawings) into the passage C. By doing so, as shown in FIG. 5, the passage C is turned into a passage C' which has a flat passage portion C1 and a circular passage portion C2. The aperture size of the flat passage portion C1 is the same as that of the passage C before being partially enlarged, the aperture size of the circular passage portion C2 approximately matches the tapered needle, and the aperture size of the circular passage portion C2 is larger than the aperture size of the flat passage portion C1. In other words, the aperture size of the flat passage portion does not fit the tapered needle, and the aperture size of the circular passage portion fits the tapered needle.

Figure 6:
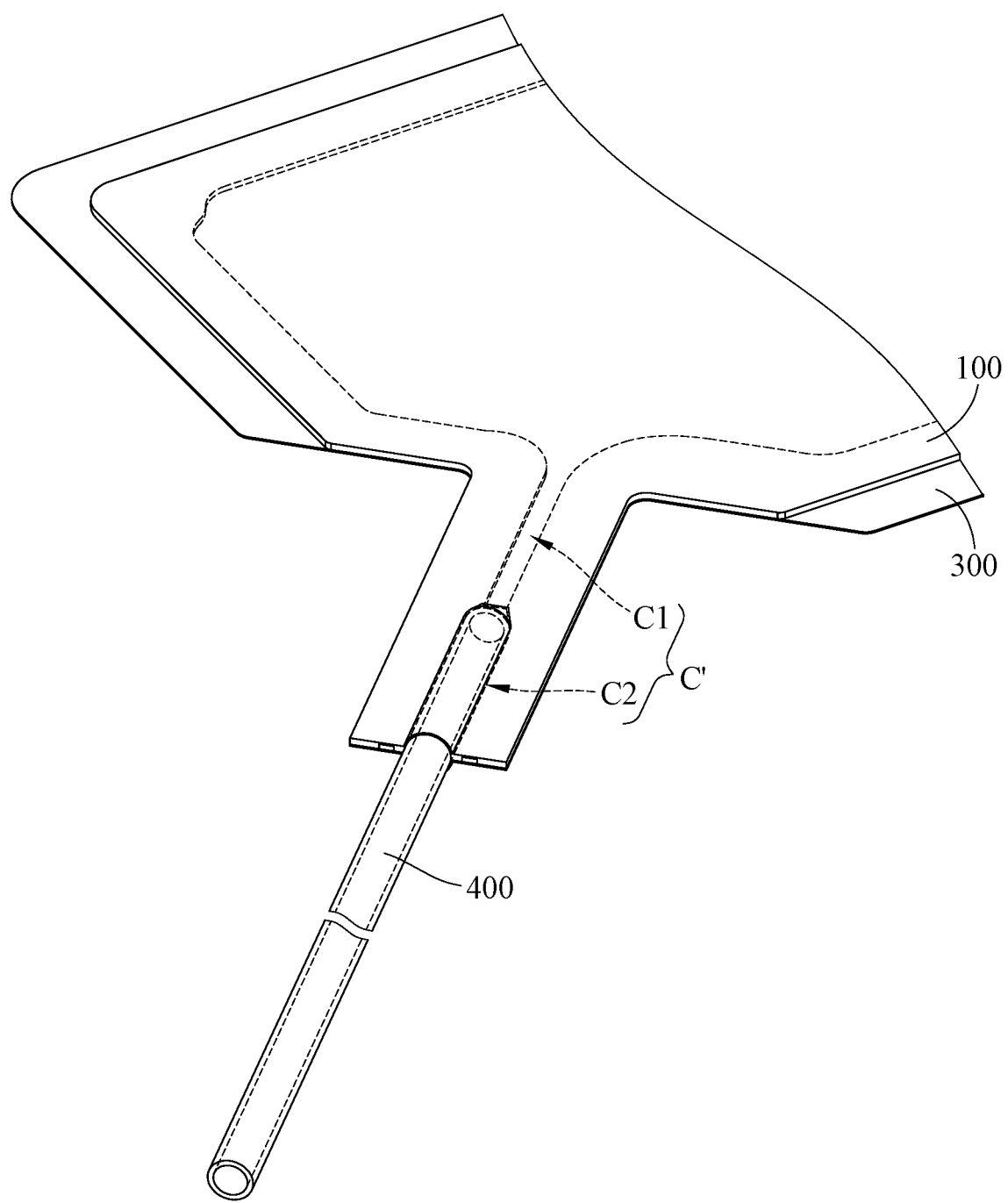

Then, as shown in FIG. 6, a degassing tube 400 is inserted into the circular passage portion C2 of the passage C'. The part of the degassing tube 400 that is inserted into the circular passage portion C2 is tapered by a process, such as turning or extrusion, thus the outer diameter thereof is smaller than that of the other part, and the degassing tube 400 is allowed to be inserted into the circular passage portion C2 of the passage C'. Additionally, the part of the degassing tube 400 that is inserted into the circular passage portion C2 of the passage C' is soldered with the first cover 100 and the second cover 300 by the similar soldering process using the solder 200 (shown in FIG. 3).

An annealing process may be performed on the degassing tube 400, the first cover 100 and the second cover 300 after they had been soldered together in order to release stress caused by the soldering process and to improve their mechanical reliability.

The degassing tube 400 is able to be connected to a degassing equipment for drawing gas and then to be connected to an injecting equipment for filling working fluid.

Figure 7:
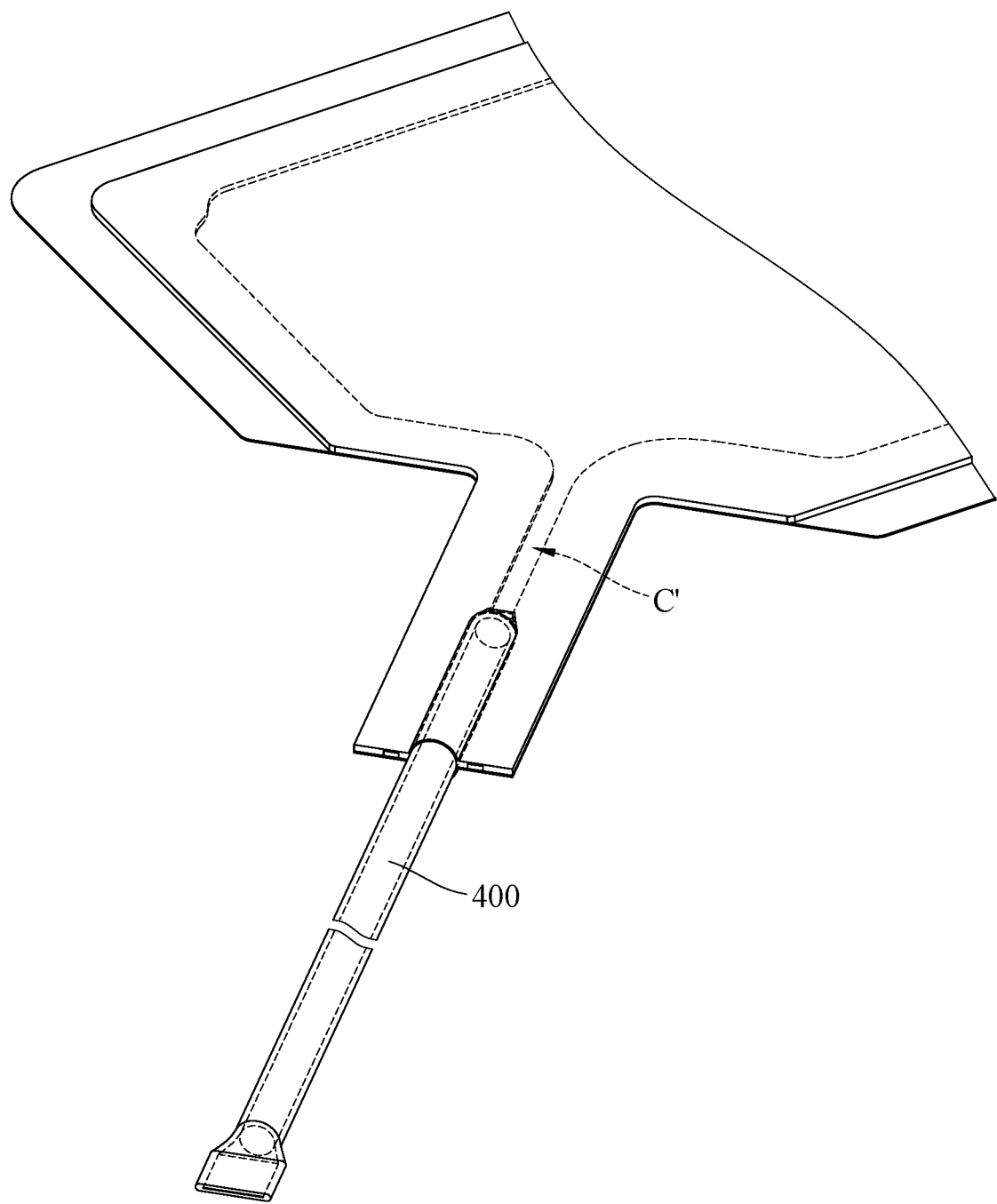

Then, as shown in FIG. 7, one end of the degassing tube 400 which is far away from the passage C' is squeezed by a stamping process and then is sealed by a welding process in order to prevent the working fluid in the chamber S (shown in FIG. 4) from leaking.

Figure 8:
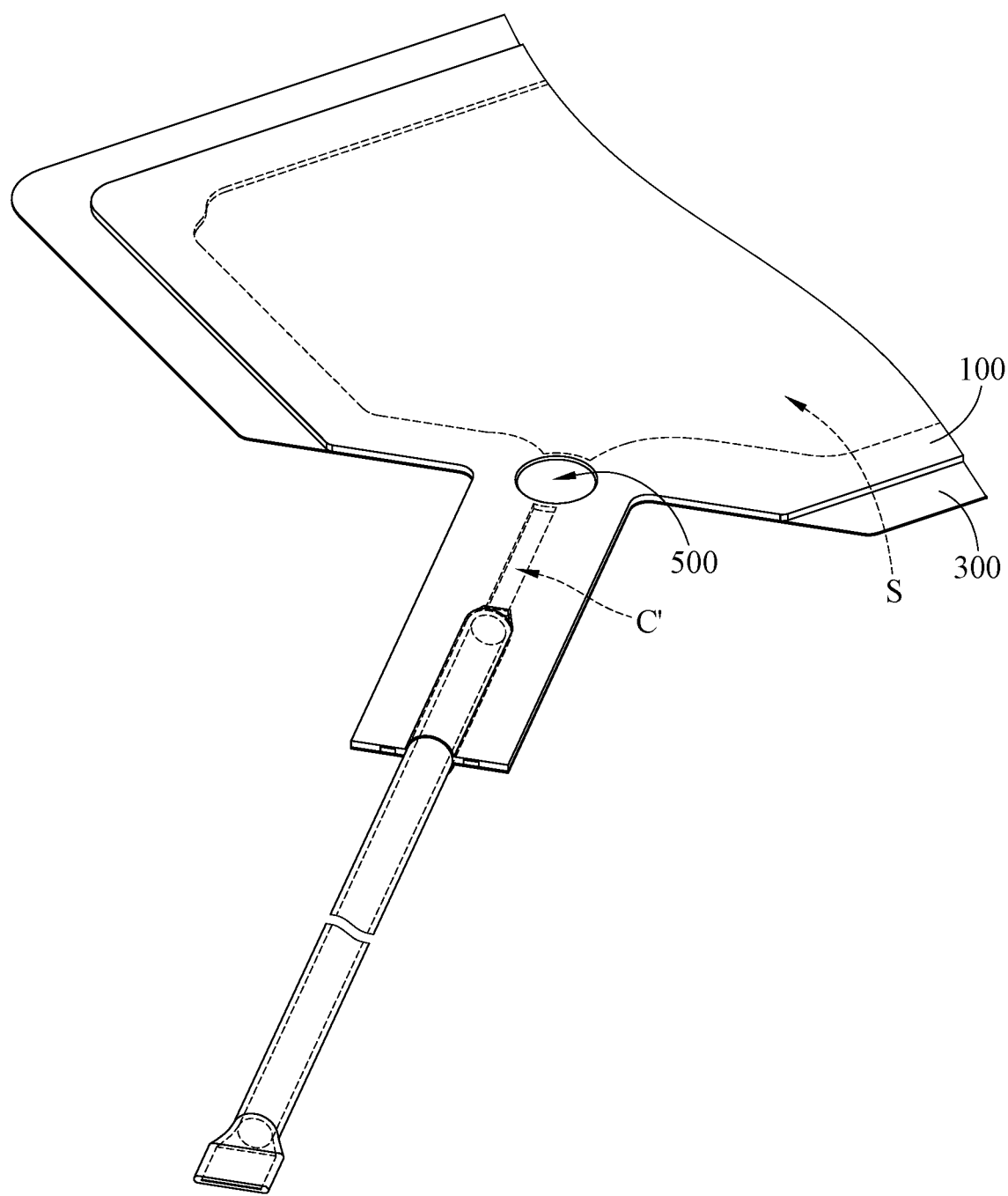

Then, as shown in FIG. 8, a joint between the chamber S and the passage C' is sealed by, for example, a resistance-welding process so as to be formed into a depressed structure 500. In the case that the flow channel 140 (shown in FIG. 3) is formed by etching, since the etching did not cause machining stress on the first cover 100, the process of forming the depressed structure 500 has a less impact on the first cover 100. On the other hand, in the case that the flow channel 140 (shown in FIG. 3) is formed by a stamping process, the first back surface 120 (shown in FIG. 3) of the first cover 100 remains to be flat since the stamping process did not cause machining stress to deform the first cover 100. Accordingly, the process of forming the depressed structure 500 also has a less impact on the first cover 100.

Figure 9:
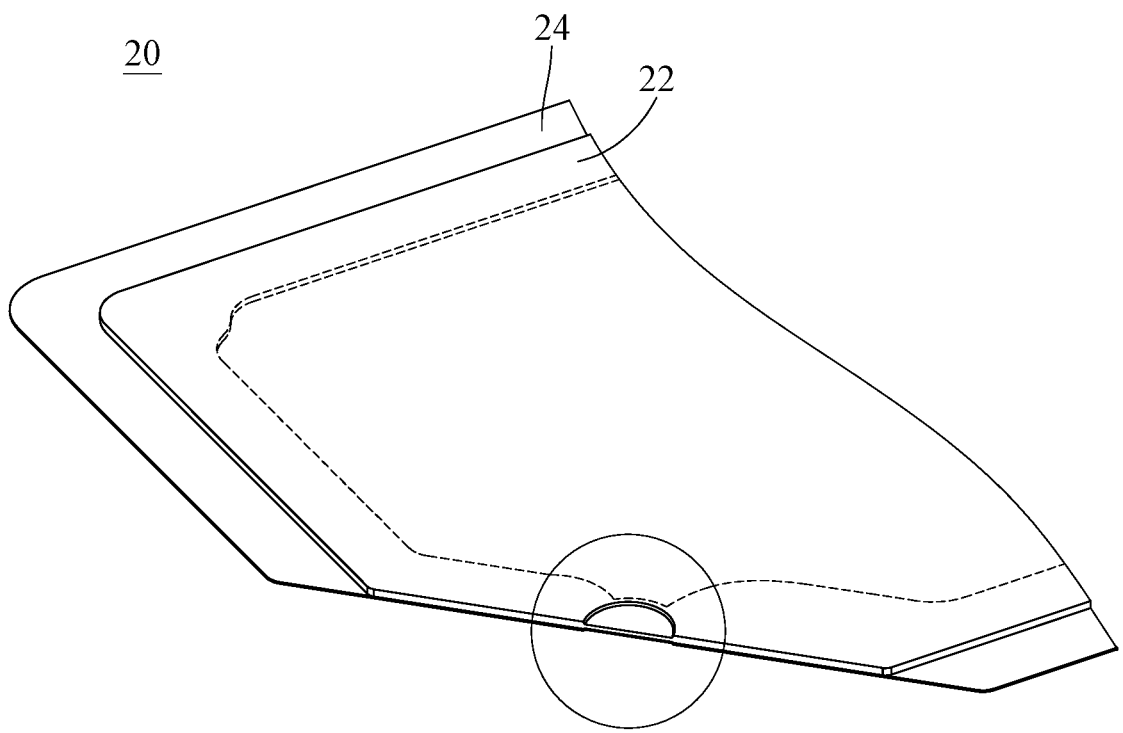
Figure 10:
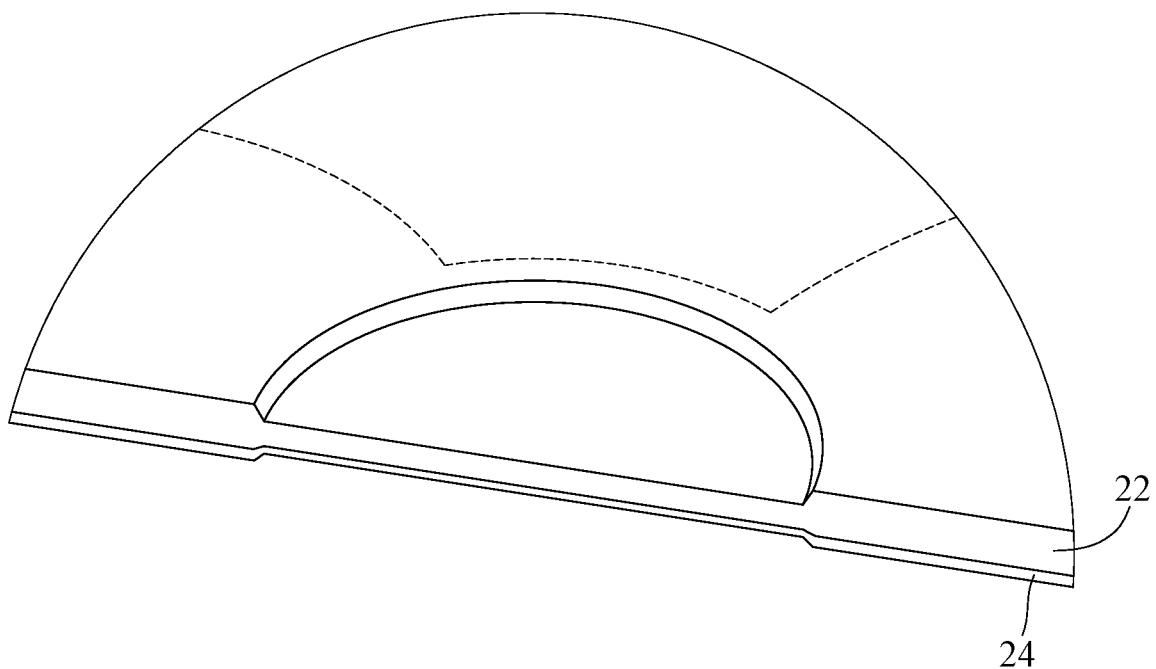

Then, as shown in FIG. 9 and FIG. 10, the parts of the first cover 100 (shown in FIG. 8) and the second cover 300 (shown in FIG. 8) that form the passage C' are cut off. By doing so, the manufacturing of the aforementioned vapor chamber 20 is completed. The remain first cover 100 is the upper cover 22 of the vapor chamber 20, and the remain second cover 300 is the lower cover 24 of the vapor chamber 20.

Furthermore, in this embodiment, the first cover 100 and the second cover 300 are directly stacked on each other during the soldering process. That is, the soldering process is only performed on two layers of flat plates without any interlayer, which helps to increase the gas tightness and to reduce the possibility of crack or wrinkle caused by the machining stress on the plates.

Next, please refer to FIGS. 11-19, showing another manufacturing process of the vapor chamber.

Figure 11:
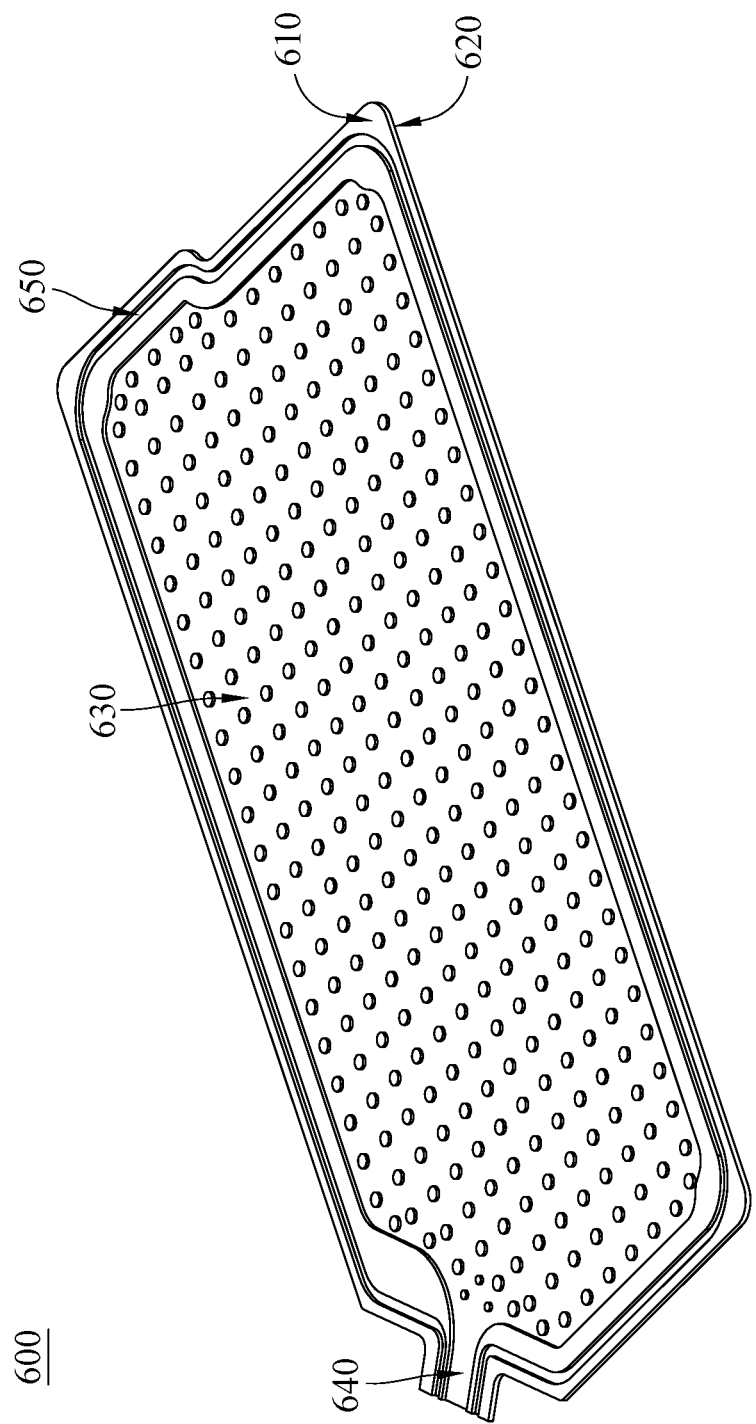
FIG. 11 to FIG. 19 show another manufacturing process of the vapor chamber.

Firstly, as shown in FIG. 11, a first cover 600 is provided. The first cover 600 has a first contacting surface 610, a first back surface 620, a containing space 630 and a flow channel 640. The first back surface 620 faces away from the first contacting surface 610. The containing space 630 and the flow channel 640 are formed on the first contacting surface 610 by, for example, an etching, sand blasting, or stamping process. The containing space 630 and the flow channel 640 are not limited to be formed by the same or different etching processes.

In this embodiment, the containing space 630 and the flow channel 640 may be formed by a stamping process, but the stamping process would not cause the first back surface 620 of the first cover 600 to deform. As shown in the figure, the first back surface 620 is still flat.

Figure 12:
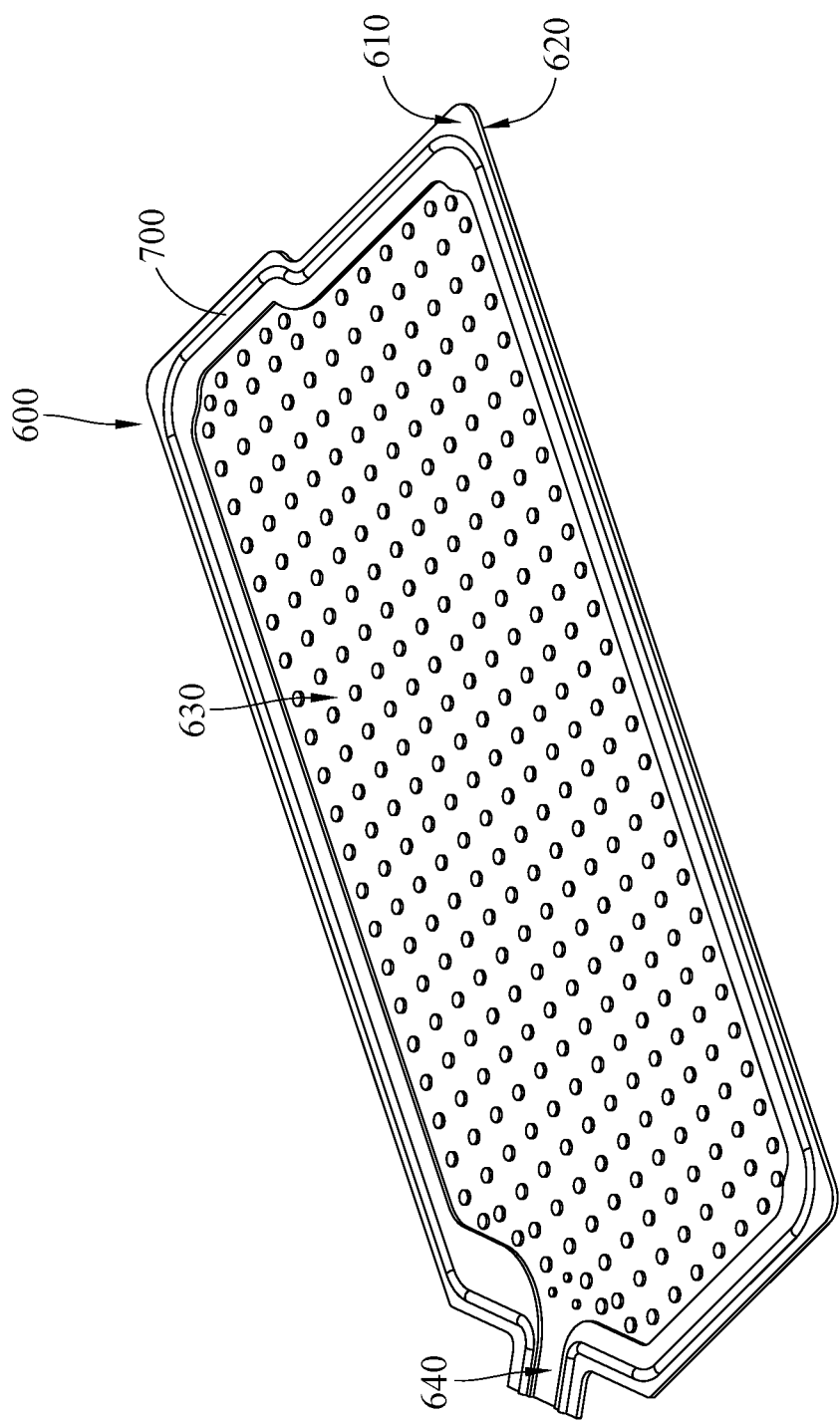

Then, as shown in FIGS. 11-12, the first cover 600 further has at least one groove 650 formed on the first contacting surface 610 along the contour of the edge of the first cover 600, and a solder 700 is injected into the groove 650. The solder 700 is, for example, a copper paste.

Figure 13:
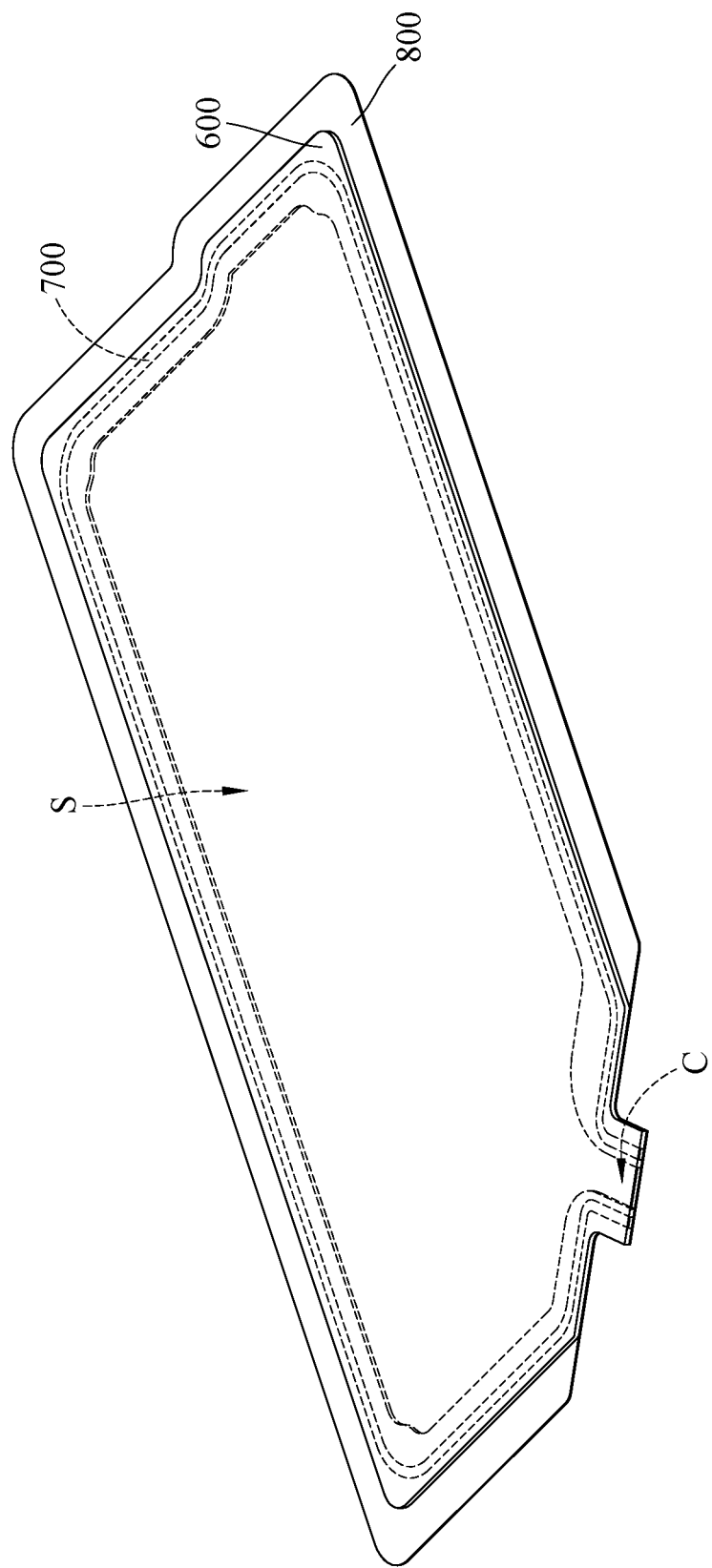

Then, as shown in FIG. 13, a second cover 800 is placed on the first cover 600. In detail, the second cover 800 is, for example, a flat plate stacked on the first cover 600 and the solder 700 which is on the first cover 600. And then the first cover 600 and the second cover 800 are assembled to each other by soldering, welding, brazing, or diffusion bounding process, such that the first cover 600 and the second cover 800 together form the chamber S at the containing space 630 of the first cover 600 and a passage C connected to the chamber S at the flow channel 640 of the first cover 600.

Figure 14:
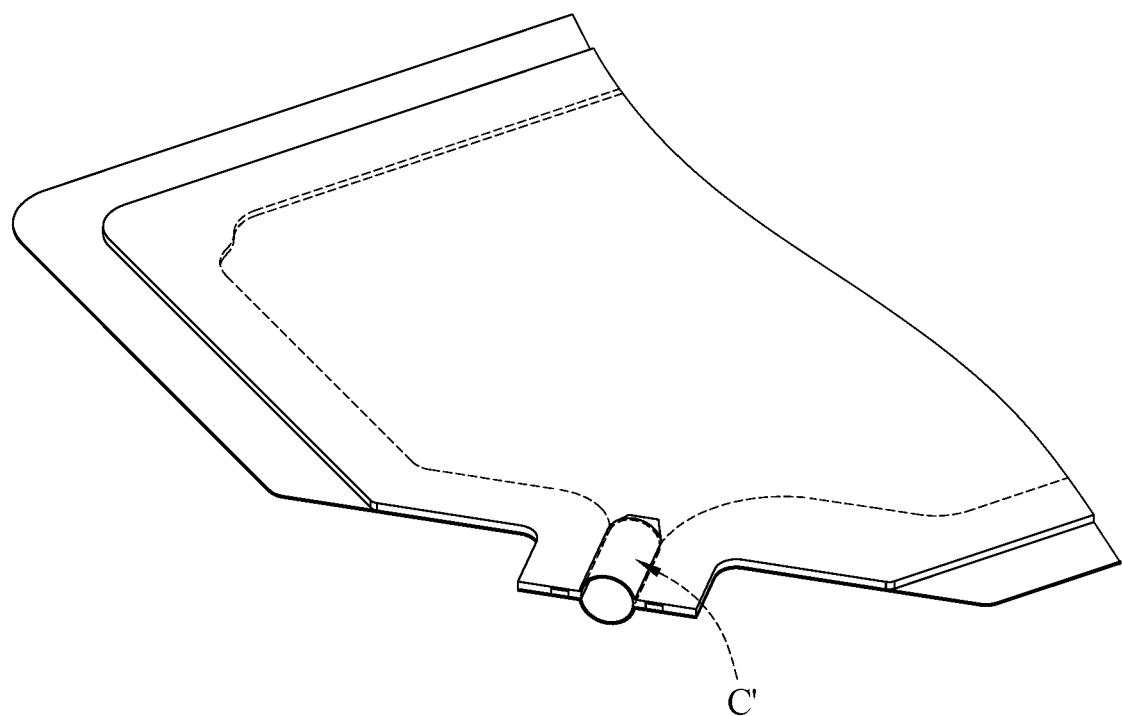

Then, part of the passage C is enlarged by, for example, inserting a tapered needle (not shown in the drawings) into the passage C. By doing so, as shown in FIG. 14, the passage C is turned into a passage C'. The aperture size of the circular passage C' (which is like the aperture size of the circular passage portion C2 of the abovementioned embodiment) approximately matches the tapered needle.

Figure 15:
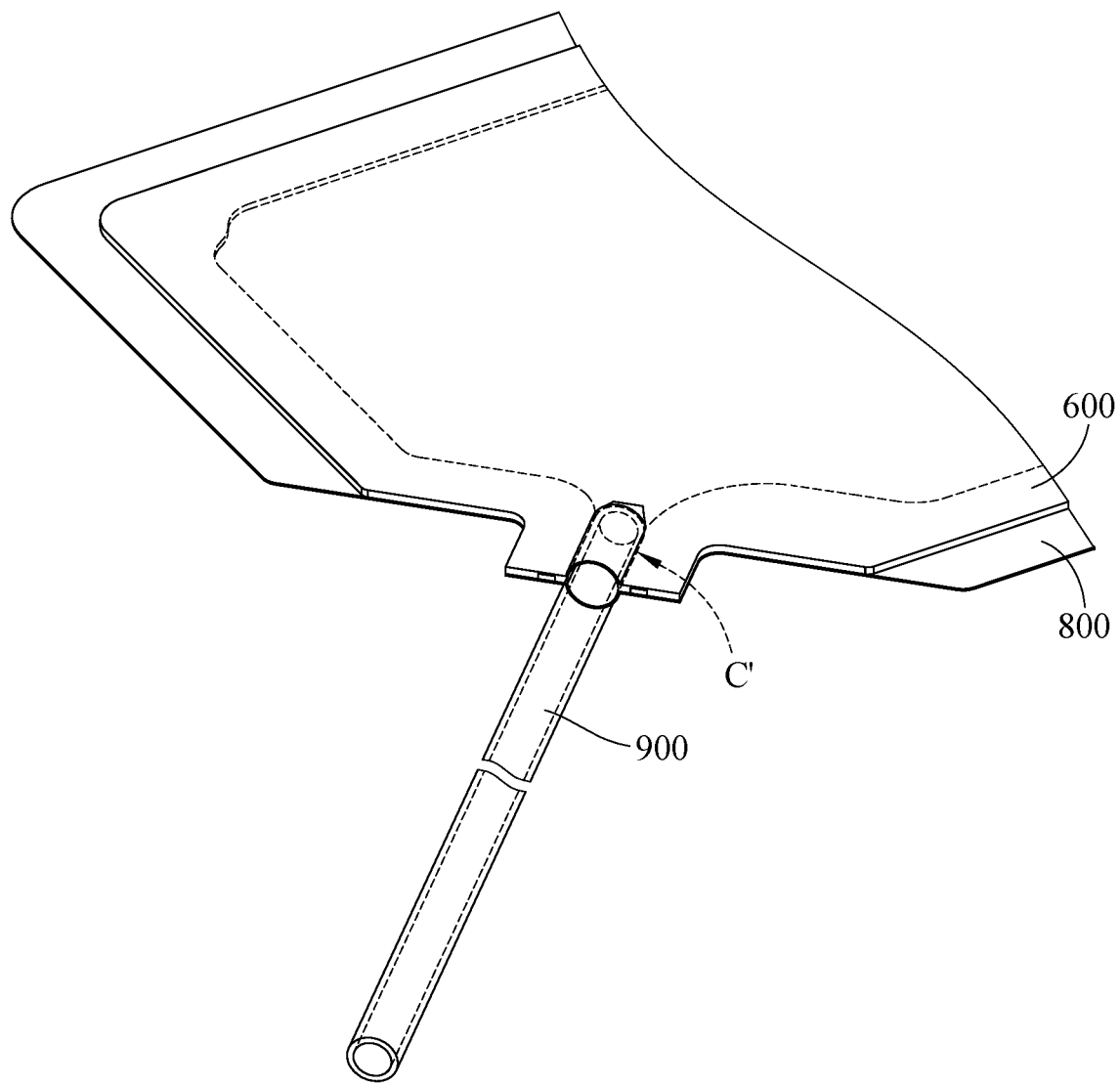

Then, as shown in FIG. 15, a degassing tube 900 is inserted into the passage C'. The part of the degassing tube 900 that is inserted into the passage C' is tapered by a process, such as turning or extrusion, thus the outer diameter thereof is smaller than that of the other part, and the degassing tube 900 is allowed to be inserted into the passage C'. Additionally, the part of the degassing tube 900 that is inserted into the passage C' is soldered with the first cover 600 and the second cover 800 by the similar soldering process using the solder 700 (shown in FIG. 12).

An annealing process may be performed on the degassing tube 900, the first cover 600 and the second cover 800 after they had been soldered together in order to release stress caused by the soldering process and to improve their mechanical reliability.

The degassing tube 900 is able to be connected to a degassing equipment for drawing gas and then to be connected to an injecting equipment for filling working fluid.

Figure 16:
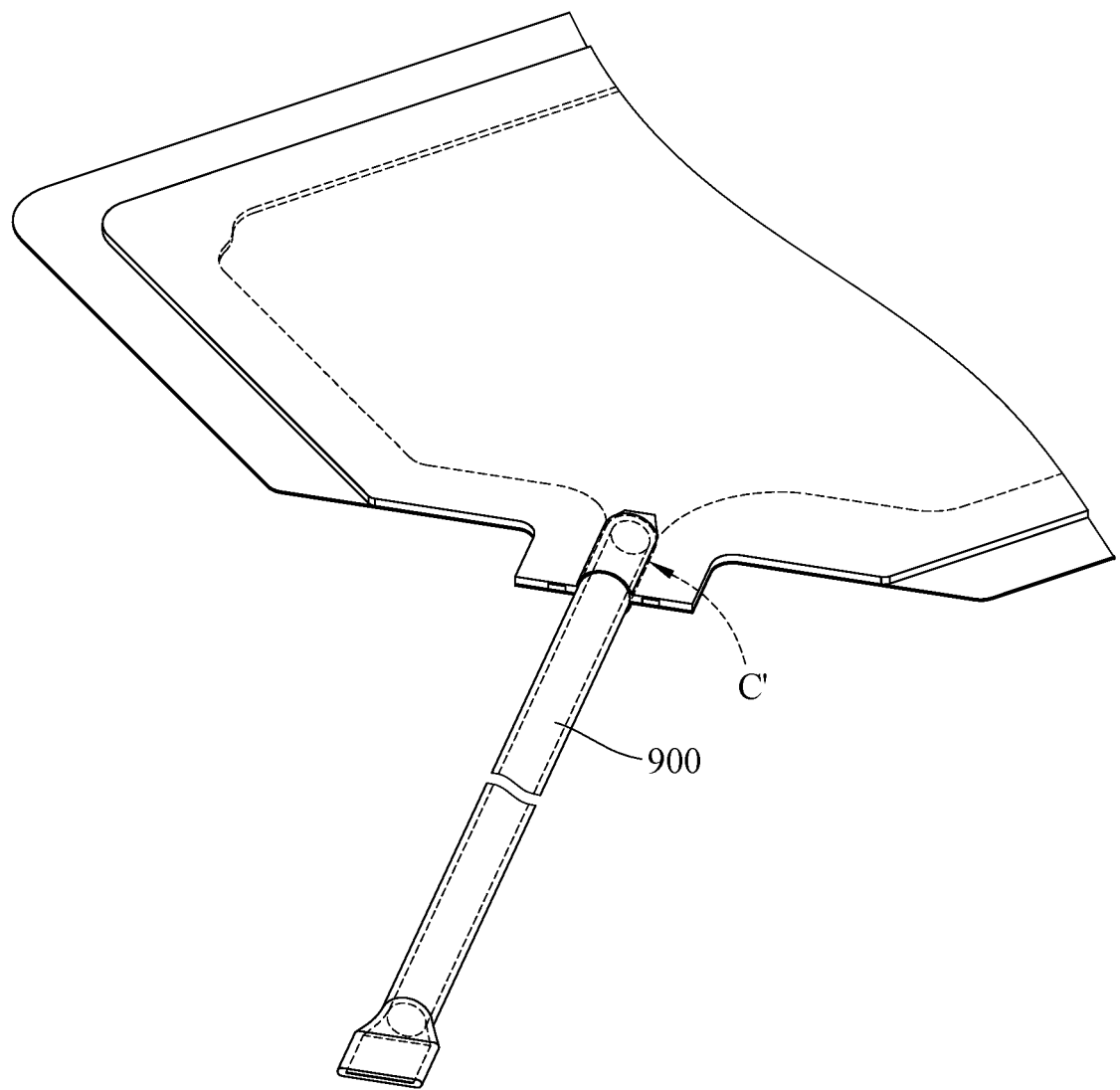

Then, as shown in FIG. 16, one end of the degassing tube 900 which is far away from the passage C' is squeezed by a stamping process and then is sealed by a welding process in order to prevent the working fluid in the chamber S (shown in FIG. 13) from leaking.

Figure 17:
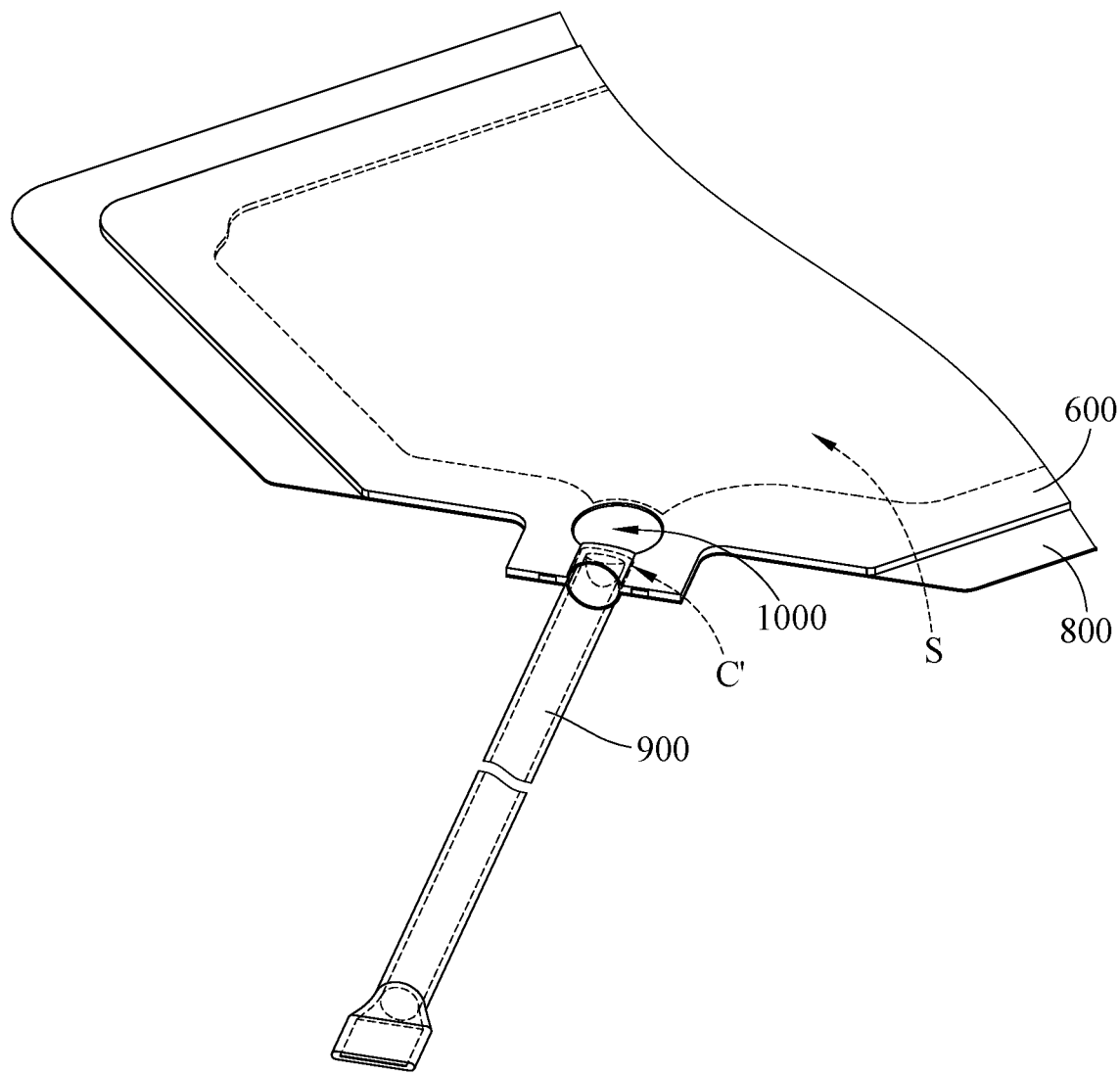

Then, as shown in FIG. 17, a joint between the chamber S and the passage C' is sealed by, for example, a resistance-welding process so as to be formed into a depressed structure 1000. In the case that the flow channel 640 (shown in FIG. 12) is formed by etching, since the etching did not cause machining stress on the first cover 600, the process of forming the depressed structure 1000 has a less impact on the first cover 600. On the other hand, in the case that the flow channel 640 (shown in FIG. 12) is formed by a stamping process, the first back surface 620 (shown in FIG. 12) of the first cover 600 remains to be flat since the stamping process did not cause machining stress to deform the first cover 600. Accordingly, the process of forming the depressed structure 1000 also has a less impact on the first cover 600.

Figure 18:
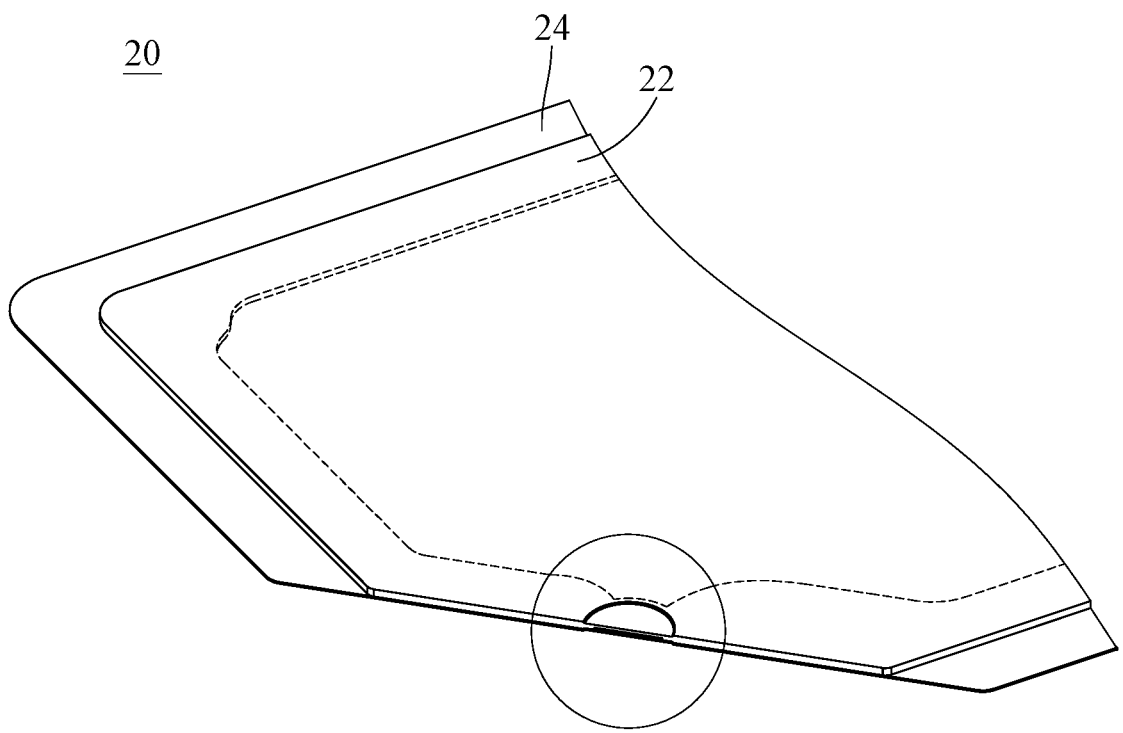
Figure 19:
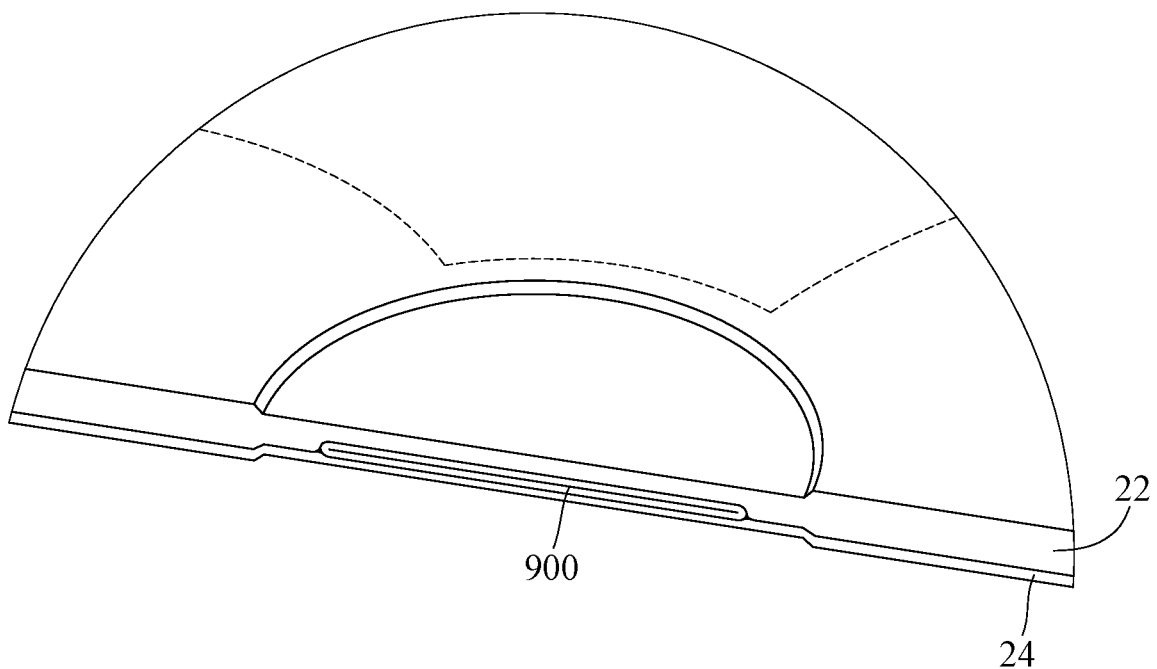

Then, as shown in FIG. 18 and FIG. 19, the parts of the first cover 600 (shown in FIG. 17) and the second cover 800 (shown in FIG. 17) that form the passage C' are cut off. By doing so, the manufacturing of the aforementioned vapor chamber 20 is completed. The remain first cover 600 is the upper cover 22 of the vapor chamber 20, and the remain second cover 800 is the lower cover 24 of the vapor chamber 20.

Furthermore, in this embodiment, the first cover 600, the second cover 800 and the degassing tube 900 are directly stacked on each other during the resistance-welding process.

The first cover and the second cover in the previous embodiments are assembled to each other by the soldering process using solder, but the disclosure is not limited thereto. Please refer to FIG. 20 to FIG. 21, which show an assembly process of a first cover and a second cover.

Figure 20:
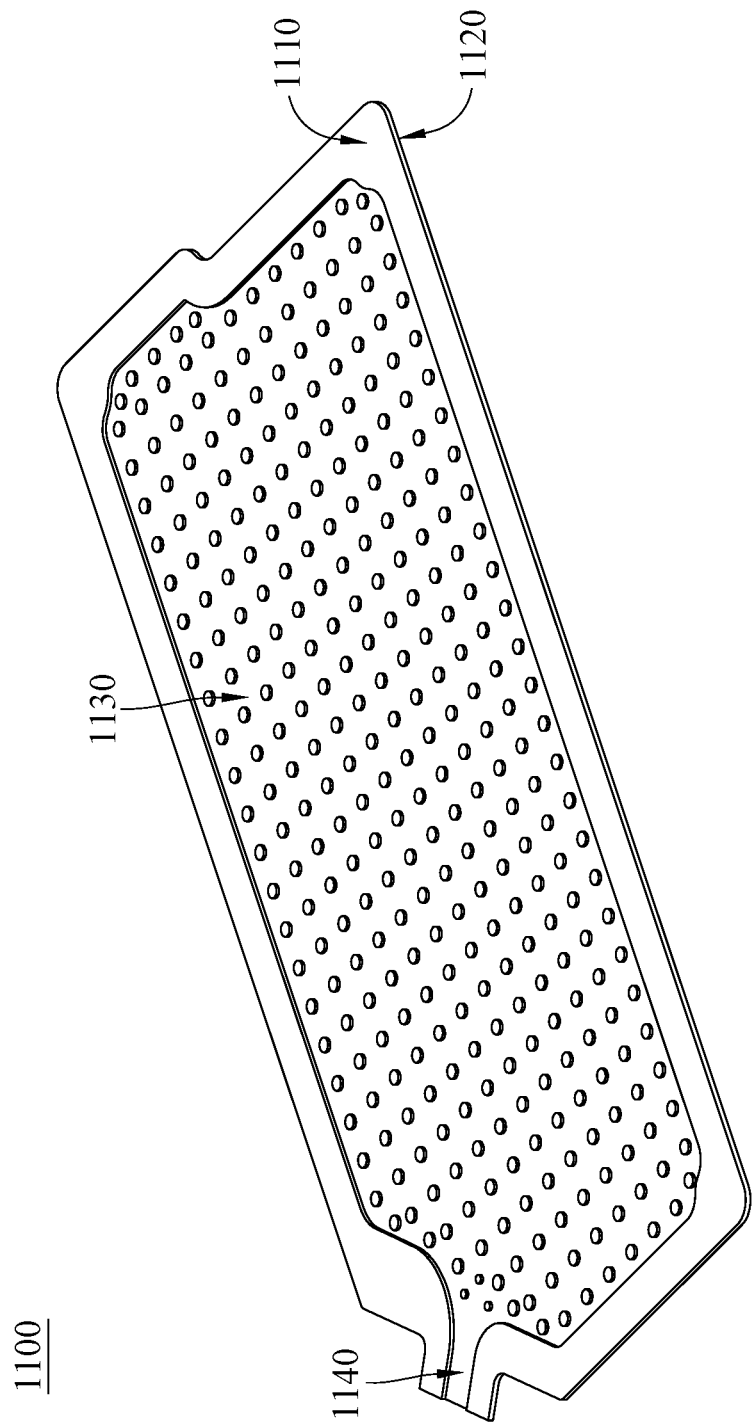
FIG. 20 to FIG. 21 show an assembly process of a first cover and a second cover.

Firstly, as shown in FIG. 20, a first cover 1100 is provided. The first cover 1100 has a first contacting surface 1110, a first back surface 1120, a containing space 1130 and a flow channel 1140. The first back surface 1120 faces away from the first contacting surface 1110. The containing space 1130 and the flow channel 1140 are formed on the first contacting surface 1110 by, for example, an etching or stamping process. The containing space 1130 and the flow channel 1140 are not limited to be formed by the same or different etching processes.

Figure 21:
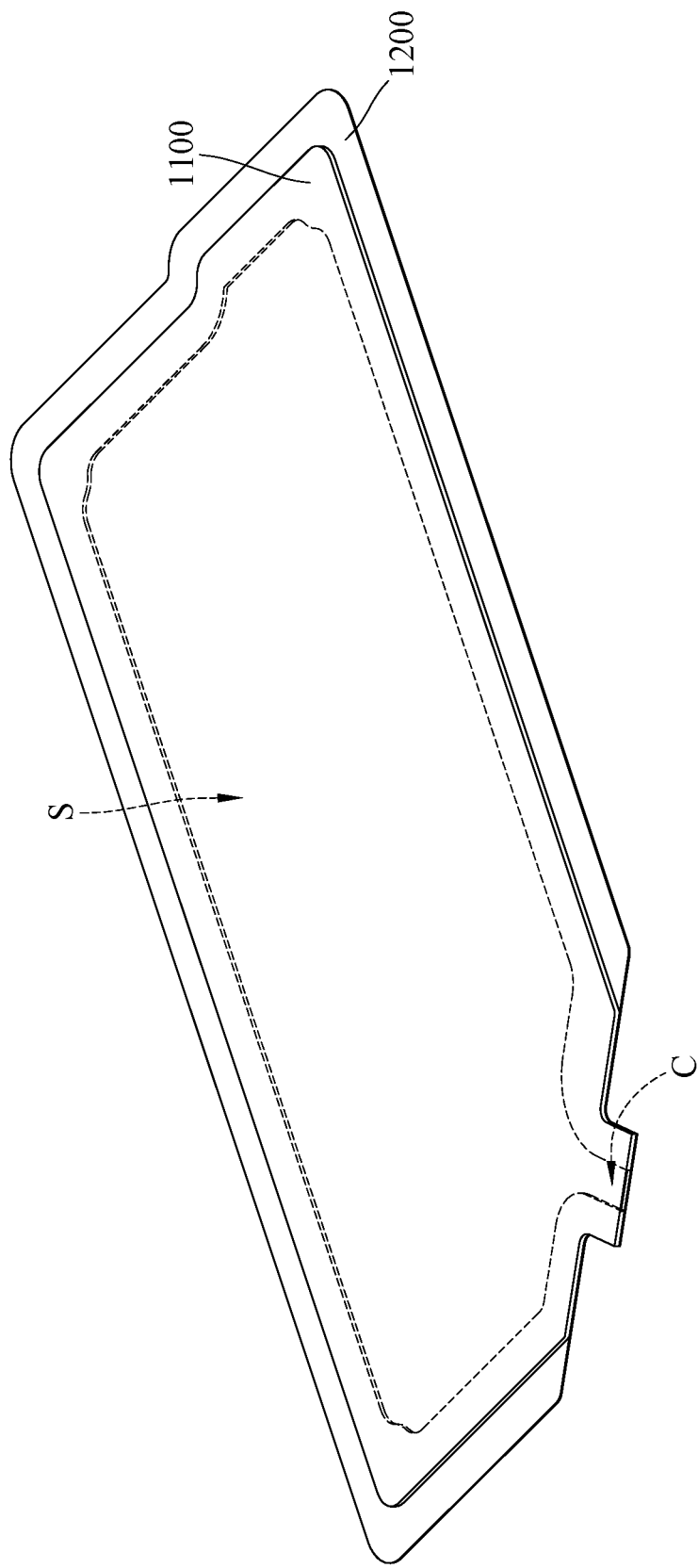

As shown in FIG. 21, a second cover 1200 is placed on the first cover 1100. In detail, the second cover 1200 is, for example, a flat plate stacked on the first cover 1100. And then the first cover 1100 and the second cover 1200 are assembled to each other by a diffusion-welding process, such that the containing space 1130 (shown in FIG. 20) of the first cover 1100 and the second cover 1200 together form the chamber S and a passage C connected to the chamber S. The so-called diffusion welding is a joining method, which is used to bond two workpieces together by placing them to have a gap reaching the atomic level under a high-temperature, high-pressure, and vacuum environment and then forcing atoms of the two workpieces to be diffused into one another.

According to the vapor chamber and the manufacturing method thereof, because the degassing tube is only inserted into the circular passage portion of the passage and is not clamped by the first cover and the second cover, the soldering process is only performed on two layers of flat plates (i.e., the first cover and the second cover) without any interlayer, which helps to increase the gas tightness.

Furthermore, in the case that the containing space and the flow channel is formed on the first cover by etching, since the etching did not cause machining stress on the first cover, the process of forming the depressed structure has a less impact on the first cover.

Also, in the case that the containing space and the flow channel is formed on the first cover by a stamping process, the first back surface of the first cover substantially remains to be flat. Accordingly, the process of forming the depressed structure also has a less impact on the first cover.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A vapor chamber, comprising:
   an upper cover; and
   a lower cover, wherein the upper cover and the lower cover are assembled together and form a chamber therebetween;
   wherein there is a sealing structure located at an edge of the upper cover, the sealing structure is recessed from an outermost surface of the upper cover that faces away from the lower cover, the upper cover has a lateral surface flush with a lateral surface of the lower cover at the edge where the sealing structure is located and other lateral surfaces each located closer to the chamber than a corresponding lateral surface of the lower cover where the sealing structure is located away, and the upper cover is directly stacked on the lower cover at the sealing structure, wherein the sealing structure comprises a semi-circle.

2. The vapor chamber according to claim 1, wherein the vapor chamber has a thickness smaller than 0.6 centimeters.

3. A vapor chamber, comprising:
an upper cover;
a lower cover, wherein the upper cover and the lower cover are assembled together, and the upper cover or the lower cover has a recess to become a chamber between the upper cover and the lower cover;
a capillary structure, located in the chamber; and
a sealing structure, located at an edge of the upper cover for preventing working fluid from leaking from the chamber, wherein the sealing structure is recessed from an outermost surface of the upper cover that faces away from the lower cover, and the upper cover has a lateral surface flush with a lateral surface of the lower cover at the edge where the sealing structure is located and other lateral surfaces each located closer to the chamber than a corresponding lateral surface of the lower cover where the sealing structure is located away, wherein the sealing structure comprises a semi-circle.

4. The vapor chamber according to claim 3, wherein the upper cover or the lower cover that has the recess has a flat outer surface opposite to the recess.

5. The vapor chamber according to claim 4, wherein the recess of the upper cover or the lower cover is formed by an etching, sand blasting, or stamping process.

6. The vapor chamber according to claim 5, wherein the upper cover has a first contacting surface and a first back surface, and the recess is formed on the first contacting surface.

7. The vapor chamber according to claim 6, wherein the upper cover and the lower cover are stacked on and assembled to each other by a soldering process.

8. The vapor chamber according to claim 6, wherein the first back surface is flat.

9. The vapor chamber according to claim 6, wherein the upper cover further has a groove formed on the first contacting surface, the groove extends along a contour of an edge of the upper cover, and the groove is configured for a solder to be injected thereinto.

10. The vapor chamber according to claim 9, wherein the lower cover is a flat plate stacked on the upper cover and the solder on the upper cover.

11. A vapor chamber, comprising:
an upper cover, having a first contacting surface and a groove, wherein the groove is formed on the first contacting surface, the groove extends along a contour of an edge of the upper cover, the groove on the upper cover forms a non-closed-loop in the edge, and the groove is configured for a solder to be injected thereinto; and
a lower cover, wherein the upper cover and the lower cover are assembled together and form a chamber therebetween with the first contacting surface facing towards the chamber;
wherein there is a sealing structure located at the position where the groove separates the edge into two branches, wherein the sealing structure is positioned between the two branches of the groove on the edge of the upper cover, and the upper cover is directly stacked on the lower cover at the sealing structure;
wherein all of the groove is located between the lower cover and a part of the first contacting surface that faces the chamber.

12. A vapor chamber, comprising:
an upper cover, having a first contacting surface, a first back surface, and a groove, wherein the groove is formed on the first contacting surface, the groove extends along a contour of an edge of the upper cover, the groove on the upper cover forms a non-closed-loop in the edge, and the groove is configured for a solder to be injected thereinto;
a lower cover, wherein the upper cover and the lower cover are assembled together, and the upper cover or the lower cover has a recess to become a chamber between the upper cover and the lower cover with the first contacting surface facing towards the chamber;
a capillary structure, located in the chamber; and
a sealing structure, located at the position where the groove separates the edge into two branches, and the groove forms a non-closed loop in the edge to prevent working fluid from leaking from the chamber, wherein the sealing structure is positioned between the two branches of the groove on the edge of the upper cover;
wherein all of the groove is located between the lower cover and a part of the first contacting surface that faces the chamber.

* * * * *